US008580367B2

(12) United States Patent
Satake et al.

(10) Patent No.: US 8,580,367 B2
(45) Date of Patent: Nov. 12, 2013

(54) ADHESIVE OPTICAL FILM, METHOD FOR MANUFACTURING ADHESIVE OPTICAL FILM AND IMAGE DISPLAY

(75) Inventors: Masayuki Satake, Osaka (JP); Masaaki Kawaguchi, Osaka (JP); Noboru Itano, Osaka (JP); Akiko Ogasawara, Osaka (JP); Osamu Hayashi, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1047 days.

(21) Appl. No.: 10/532,712

(22) PCT Filed: Oct. 27, 2003

(86) PCT No.: PCT/JP03/13706
§ 371 (c)(1),
(2), (4) Date: Nov. 16, 2005

(87) PCT Pub. No.: WO2004/038464
PCT Pub. Date: May 6, 2004

(65) Prior Publication Data
US 2006/0108050 A1 May 25, 2006

(30) Foreign Application Priority Data

Oct. 28, 2002 (JP) .............. P.2002-312699
Sep. 9, 2003 (JP) .............. P.2003-317383

(51) Int. Cl.
*B32B 7/00* (2006.01)
(52) U.S. Cl.
USPC ........ 428/40.1; 428/41.8; 428/66.7; 428/122; 428/192; 428/343

(58) Field of Classification Search
USPC .............. 428/1.61, 40.1, 41.8, 122, 130, 167, 428/192, 343; 349/122
See application file for complete search history.

(56) References Cited

U.S. PATENT DOCUMENTS

2002/0191287 A1* 12/2002 Miyazawa et al. ............ 359/486

FOREIGN PATENT DOCUMENTS

| JP | 2000-214324 | 8/2000 |
|----|-------------|--------|
| JP | 2000-214324 A | 8/2000 |
| JP | 2000-258627 | 9/2000 |
| JP | 2000-258628 | 9/2000 |
| JP | 2000-328012 | 11/2000 |
| JP | 2001-033623 | 2/2001 |
| JP | 2001-235626 | 8/2001 |
| JP | 2001-254061 | 9/2001 |
| JP | 2001-272539 | 10/2001 |
| JP | 2002-303730 | 10/2002 |

OTHER PUBLICATIONS

Atagi, Naoyasu, JP 2000214324 A English Machine Translation, Aug. 2000, Japan.*
Hideo, Ikeda, JP 2002-303730, Oct. 2002 (Machine Translation).*
*Handbook of Pressure Sensitive Adhesion* (Second Edition): Japan Adhesive Tape Manufacturers Association (1995), pp. 409-410.
Japanese Office Action dated May 9, 2008, issued in corresponding Japanese Patent Application No. 2003-317383.

* cited by examiner

*Primary Examiner* — Callie Shosho
*Assistant Examiner* — Cheng Huang
(74) *Attorney, Agent, or Firm* — Westerman, Hattori, Daniels & Adrian, LLP

(57) ABSTRACT

An adhesive layer included in an adhesive-type optical film forms a portion located on the inside of a edge line of an optical film.

7 Claims, 2 Drawing Sheets

ADHESIVE OPTICAL FILM, METHOD FOR MANUFACTURING ADHESIVE OPTICAL FILM AND IMAGE DISPLAY

FIELD OF THE INVENTION

The present invention relates to an adhesive-type optical film that has an adhesive layer laminated on one side or both sides of an optical film. Further, the present invention relates to an adhesive-type optical film that includes the aforementioned adhesive-type optical film and at least one layer selected from a release film, an optical layer, an optical film and an adhesive layer, and an image display device such as a liquid crystal display (LCD), an electroluminescence display (ELD), a plasma display panel (PDP) and a field emission display (FED), wherein the aforementioned adhesive-type optical film is used.

BACKGROUND ART

Placement of polarizing plates on both sides of a glass substrate, which forms the outermost face of a liquid-crystal panel, is indispensable for a liquid crystal display because of the picture formation system adopted therein, and a polarizing plate is generally stuck on the outermost face of a liquid-crystal panel. In addition, there is a considerable growth in the use of various optical elements besides the polarizing plate on the outermost face of a liquid-crystal panel with the intention of further enhancing display quality. For instance, a retardation plate for prevention of coloring, a viewing angle enlarging film for widening a viewing angle and a brightness enhancement film for enhancing contrast and so on are used. These films are collectively referred to as optical films.

When the optical films as recited above are bonded, an adhesive is generally used in order to prevent losses due to reflection of light from the interfaces. In addition, the adhesive is previously provided on one side or both sides of an optical film as a adhesive layer because of its advantages that it can fix the optical film instantaneously, eliminate the necessity for the optical film to undergo a drying process for fixation, and so on. In other words, adhesive-type optical films are generally used in bonding optical films to a liquid-crystal panel and the like.

When the aforementioned adhesive-type optical films are, e.g., transported, handled, or conveyed on the manufacturing and processing-operation lines, a defective situation, specifically a phenomenon that the adhesives in edges of the adhesive-type optical films are dropped out in a chipped state due to contact between the optical films' ends and substances of some kinds (hereinafter referred to as "adhesive chips"), is brought about at externally unprotected side faces of the adhesive layers. In addition, there occurs a case where dropped-out adhesive contaminates the surfaces of optical films (hereinafter referred to as "adhesive contamination"). If once adhesive chips occurs, secure bonding becomes impossible, and what is worse, the chipped parts form an air layer and come to have different refractive index and vibration direction from other parts, thereby becoming a cause of defective display. Likewise, the adhesive contamination also causes defective display.

For prevention of such adhesive chips and adhesive contamination, the method of attaching powder to edges of an adhesive layer (see, e.g., Patent Document 1), the method of forming a non-tack layer on edges of an adhesive layer by spray coating (see, e.g., Patent Document 2), or the method of molding the side faces of an adhesive-type optical film into a projection-and-depression repeat structure (see, e.g., Patent Document 3) have so far been adopted. However, these methods involve contamination with an extraneous substance, such as powder or a sprayed coat, or require complex processes. Therefore, simpler and easier methods have been sought.

[Patent Document 1] JP 2001-272539 A
[Patent Document 2] JP 2000-258627 A
[Patent Document 3] JP 2001-033623 A

DISCLOSURE OF THE INVENTION

The present invention aims to provide more simply and more easily an adhesive-type optical film that has an adhesive layer laminated on one side or both sides of an optical film and hardly suffers adhesive chips and adhesive contamination during transport and handling, or on the manufacturing and processing-operation lines. Further, the present invention aims to provide a method for producing the adhesive-type optical film and image display device using the adhesive-type optical film.

In accordance with the present invention, provided is an adhesive-type optical film having an adhesive layer on one or both sides of an optical film, namely at least one side of an optical film, wherein the adhesive layer has a part located on the inside of optical film's edge lines. In other words, the adhesive-type optical film provided by the present invention is an adhesive-type optical film including an optical film and an adhesive layer laminated on at least one side of the optical film, wherein at least a portion of an edge of the adhesive layer is located on the inside of the optical film's edge lines. Such a portion of adhesive layer's edge as to be located on the inside of the optical film's edge lines is referred to as "inside edge".

On the aforementioned adhesive-type optical film, it is possible to laminate at least one layer selected from a release film, an optical layer, an optical film and an adhesive layer. The present adhesive-type optical film can be applied to an image display device, such as LCD, ELD or FED.

The present invention further provides a method for producing an adhesive-type optical film comprising applying a pressure on an adhesive layer from both sides thereof to extrude part of the adhesive layer from an edge of a side surface of an optical film, shaving or cutting a side surface of the adhesive layer in the state, and then releasing the pressure on the adhesive layer.

In accordance with the present invention, the adhesive layer of an adhesive-type optical film having an adhesive layer laminated on one or both sides of an optical film locates on the inside of the optical film's edge lines, and thereby the adhesive-type optical film resistant to bringing about not only contamination with the adhesive pushed out from the edges (adhesive contamination) but also adhesive chips during transport and handling or on the manufacturing and processing-operation lines can be obtained more easily and more simply than ever.

Figure 1A:
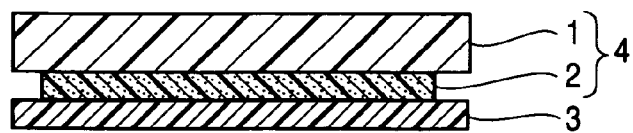
FIG. 1A and FIG. 1B are schematic cross-sectional views of adhesive-type optical films according to the present invention.

The reference numerals used in the drawings, 1 denotes an optical film, 2 denotes an adhesive layer, 3 denotes any of a release film, an optical layer, an optical film and an adhesive layer, and 4 denotes an adhesive-type optical film.

BEST MODE FOR CARRYING OUT THE INVENTION

The making of adhesive-type optical films in the present invention is performed by forming an adhesive layer on one side or both sides of each optical film, and these adhesive-type optical films can be used in a form that they are stacked on top of each other in two or more layers, or they each may also be used as an adhesive-type optical film on which a release film, an optical film or an optical layer is laminated. Additionally, it is undesirable to leave or transport the optical films in a condition that their adhesive layers are bare and in direct contact with aerial interface, so it is preferable that the adhesive-type optical films be just provided with release film layers for the purpose of protection before their uses.

Figure 1B:
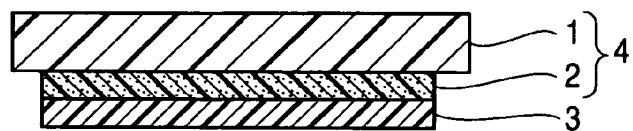
Figure 3A:
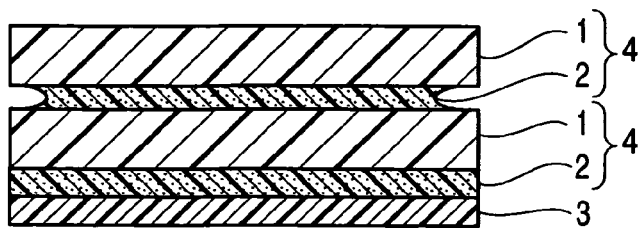
FIG. 3A and FIG. 3B are schematic views showing examples of cross-sectional profiles of adhesive layers in the present adhesive-type optical films which each have two or more adhesive layers.
Figure 3B:
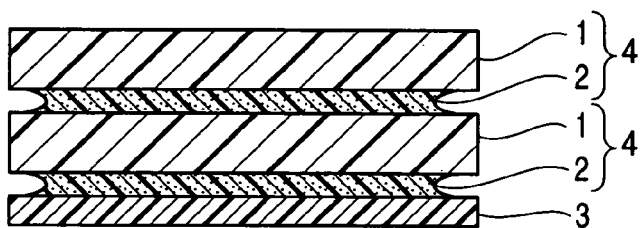

Basic examples of the adhesive-type optical film are shown in FIG. 1A and FIG. 1B. Each of these adhesive-type optical films 4 is made by laminating an adhesive layer 2 on one side or both sides of an optical film 1, namely at least one side of an optical film. As shown in FIG. 3A and FIG. 3B, the adhesive-type optical films 4 may be stacked in two or more layers. In addition, a layer 3 selected from a release film, an optical layer, an optical film and an adhesive layer may be laminated thereon.

As an example of the foregoing optical film, mention may be made of an optical element supported by a substrate like a film, and used for forming an image display device. Specific examples thereof include a polarizing plate, a polarization conversion element, a reflector and a semitransparent reflector, a retardation plate (including ½ and ¼ wavelength plates (λ plates)), a viewing angle compensating film, a brightness enhancement film and a protective film.

The above-mentioned optical layer represents an optical element formed on the foregoing optical film directly or via a pressure-sensitive adhesive layer or an adhesive layer and used for forming an image display device. Specific examples of thereof include a various type of oriented liquid-crystal layers having properties of controlling viewing angle compensation characteristics and birefringence characteristics and a various type of surface-treated layers, such as an easy-bonding treated layer, a hard coat layer, an anti-reflection layer, an anti-sticking layer, a diffusion layer and an anti-glare layer.

Examples of the release film include a thin layer of synthetic resin films such as polyethylene, polypropylene and polyethylene terephthalate films, a rubber sheet, a paper, a cloth, a nonwoven fabric, a net, a foamed sheet, a metal foil, and a laminates thereof. In addition, it is preferable that a surface of the release film is subjected a treatment such as silicone treatment, long-chain alkyl treatment or fluoric treatment as needed in order to enhance a releasability from the adhesive layer.

Adhesive compositions forming the adhesive layer of the present adhesive-type optical film have no particular limitation so far as they have no adverse influences on optical characteristics required. Examples thereof include compositions prepared by blending an acrylic polymer with an acrylic oligomer and a silane coupling agent, and compositions prepared by adding an acrylic polymer with a photopolymerization initiator and being irradiated with the ultraviolet (UV) ray.

The above acrylic polymers can be obtained by copolymerizing alkyl (meth)acrylates as main monomers and monomers having functional groups capable of reacting with multifunctional compounds. Further, it is also possible to introduce carboxyl groups into acrylic polymers. Weight average molecular weights of the acrylic polymers are 400,000 or above, preferably from 1,000,000 to 2,000,000. Incidentally, the expression "(meth)acrylates" signifies acrylates, methacrylates or acrylate-methacrylate mixtures, and the term "(meth)" as used herein has the same meaning as described above.

The average number of carbon atoms in the alkyl group of an alkyl (meth)acrylate constituting the main skeleton of an acrylic polymer is from 1 to 12. Examples of such an alkyl (meth)acrylate include methyl (meth)acrylate, ethyl (meth) acrylate, butyl (meth)acrylate, 2-ethylhexyl (meth)acrylate and isooctyl (meth)acrylate. These monomers can be used alone or as combinations.

Examples of a monomer unit having a functional group reacting with a multifunctional compound capable of copolymerizing with the foregoing acrylic polymers include monomers containing carboxyl groups, monomers containing hydroxyl groups and monomers containing epoxy groups. The monomers containing carboxyl groups are, e.g., acrylic acid, methacrylic acid, fumaric acid, maleic acid and itaconic acid. The monomers containing hydroxyl groups are, e.g., 2-hydroxyethyl (meth)acrylate, hydroxybutyl (meth)acrylate, hydroxyhexyl (meth)acrylate and N-methylol (meth) acrylamide. One of examples of the monomers containing epoxy groups is glycidyl (meth)acrylate. Among them, the use of monomers containing carboxyl groups is preferable in the present invention.

Into the acrylic polymers as recited above, monomer units having nitrogen elements can further be introduced. Examples of monomers containing nitrogen elements include (meth)acrylamide, N,N-dimethyl(meth)acrylamide, N,n-diethyl(meth)acrylamide, (meth)acryloylmorpholine, (meth) acetonitrile, vinyl pyrrolidone, N-cyclohexylmaleimide, itaconimide and N,N-dimethylaminoethyl(meth)acrylamide. In addition to these monomers, vinyl acetate, styrene and the like can be used in acrylic polymers to such an extent as not to impair adhesive properties. Those monomers can be used alone or as combinations of two or more thereof.

The proportion of the foregoing monomer unit in the acrylic polymer are not particularly limited, but it is preferable that the proportions is about 0.1 to 12 parts by weight, more preferably 0.5 to 10 parts by weight with respect to 100 parts by weight of alkyl (meth)acrylates from the view point of durability.

The acrylic polymers as recited above can be prepared in accordance with a method selected appropriately from various general methods, such as radical polymerization methods including a bulk polymerization method, a solution polymerization method and a suspension polymerization method, or photo polymerization methods using, e.g., ultraviolet light. In radical polymerization, various general azo-type and peroxide-type initiators can be used, the reaction temperature is from 50° C. to 85° C. and the reaction time is from 1 to 10 hours. Of the foregoing preparation methods, the solution polymerization method is preferable over the others and polar solvents, such as ethyl acetate and toluene, are generally used as solvents for acrylic polymers. The concentration of such a solution is generally from 20 to 80% by weight. Moreover, it is also preferable to adopt a method of producing the foregoing acrylic polymers in accordance with UV polymerization using a photo-polymerization initiator including benzophenone.

In the present invention, acrylic polymers having weight average molecular weights of 400,000 or more are used, and in conjunction therewith acrylic oligomer having good compatibility with the acrylic polymers and having a weight-average molecular weight of preferably 800 to 50,000, more preferably 1,000 to 10,000, may be used. The oligomer is used in an amount of from 1 to 300 parts by weight, preferably from 10 to 250 parts by weight, more preferably from 20 to 200 parts by weight with respect to 100 parts by weight of acrylic polymer. When the amount of acrylic oligomer used is smaller than 1 parts by weight, adhesion becomes so strong that satisfactory reworking properties cannot be obtained; while, when the acrylic oligomers is used in an amount greater than 70 parts by weight, problems (foaming, delamination) tend to occur under conditions of high temperature and high humidity. The glass transition temperature of acrylic oligomer are from −5° C. to −100° C., preferably from −15° C. to −70° C. The weight average molecular weights lower than 800 are undesirable, because such oligomers cause changes in adhesion characteristics through pollution of glass substrate surface as an adherend and bleeding of low molecular weight components. When the glass transition temperature is higher than −5° C. or the weight average molecular weight exceeds 50,000, on the other hand, adhesion becomes strong and satisfactory reworking properties cannot be obtained. Further, the molecular weight distribution of acrylic oligomers in the present invention is preferably from 1 to 2, more preferably from 1 to 1.7. The molecular distribution wider than 2 is undesirable because changes in adhesion characteristics are caused by pollution of glass substrate surface as an adherend and bleeding of low molecular weight components.

Acrylic oligomers usable herein are oligomers having their respective main skeletons made up of the same (meth)acrylate monomer units as in the foregoing acrylic monomers, which may include the same comonomer units as recited above in copolymerized form.

The acrylic oligomers can be prepared according to various general methods. One example thereof is a method of preparing them by living radical polymerization using a specified polymerization activator and a radical polymerization initiator. By the use of this method, acrylic oligomers having narrow molecular weight distribution can be prepared easily in the presence of no or small amount of solvent without problems of polymerization heat control and so on.

A transition metal and its ligands are used as the foregoing radical polymerization initiator. Examples of such a transition metal include Cu, Ru, Fe, Rh, V and Ni, and these metals are generally used in halide (chloride, bromide or the like) form. The ligands form a coordinate complex with the transition metal at the center, and suitable examples thereof include bipyridine derivatives, mercaptane derivatives and trifluorate derivatives. Of coordinate combinations with transition metals and ligands, $Cu^{+1}$-bipyridine complex is preferable over the others from the viewpoints of stability and speed of polymerization.

Compounds suitable as the foregoing radical polymerization initiator are ester or styrene derivatives having halogens at their individual α-positions, especially 2-bromo(or chloro) propionic acid derivatives and chlorinated (or brominated) 1-phenyl derivatives. Examples of such derivatives include methyl 2-bromo(or chloro)propionate, ethyl 2-bromo(or chloro)propionate, methyl 2-bromo(or chloro)methylpropionate, ethyl 2-bromo(or chloro)-2-methylpropionate and 1-phenylethyl chloride (or bromide).

In the living radical polymerization, it is preferable that a radical polymerization initiator is used in a proportion of from 0.01 to 5% by mole to polymerizing components. A transition metal in halide form is generally used in an amount from 0.01 to 1 mole per mole of radical polymerization initiator as recited above. Further, the ligands for the transition metal are generally used in an amount from 1 to 3 moles per mole of transition metal as recited above (in the form of halide or so on). The use of the radical polymerization initiator and the polymerization activator in the aforementioned proportions can have good results on reactivity in the living radical polymerization, weight average molecular weights of the oligomers produced, and so on.

It is possible to proceed with living radical polymerization as mentioned above without using any solvent, or it is permissible to proceed with the living radical polymerization in the presence of a solvent, such as butyl acetate, toluene or xylene. When a solvent is used, it is preferable for prevention of decrease in polymerizing speed to control the amount of solvent used so that the solvent concentration becomes 50% by weight or below at the conclusion of polymerization. As to the polymerization conditions, the polymerization temperature is from 50 to 130° C. and the polymerization time is of the order to 1 to 24 hours in consideration of polymerizing speed and deactivation of a catalyst used.

The oligomers formed in the foregoing manner are made up of homopolymers, random copolymers or block copolymers, and they are polymers having narrow molecular weight distribution (a low ratio of the weight average molecular weight to the number average molecular weight). Incidentally, a random copolymer can be formed by sequential living radical polymerization of two or more kinds of monomers.

The number average molecular weight is a value measured by GPC (gel permeation chromatography) method and used in calculation in terms of polystyrene. The number average molecular weight (Mn) of oligomers is given by the expression Mn (calculated value)=[(molecular weight of monomer)×(mole ratio of monomer)]/(mole ratio of polymerization initiator). Therefore, the number average molecular weight of oligomers can be adjusted by controlling the ratio of the amount of monomer prepared to the amount of polymerization initiator prepared, and the intended oligomers can be obtained with ease.

As to the foregoing photo polymerization initiator, various types of photo polymerization initiators can be used without particular restrictions. Such initiators can be exemplified by Irgacure 907, Irgacure 184, Irgacure 651, Irgacure 369 and the like which are produced by Ciba Specialty Chemicals. It is generally appropriate that the photo polymerization initiator be added in an amount of about 0.5 to about 30 parts by weight to 100 parts by weight of polymerizing components.

In the foregoing adhesive composition, a multifunctional compound can be used. This multifunctional compound is, e.g., an organic cross-linking agent or a multifunctional metal chelate. Examples of an organic cross-linking agent include cross-linking agents of epoxy type, cross-linking agents of isocyanate type and cross-linking agents of imine type. The multifunctional metal chelate is a compound formed by combining a polyvalent metal atom with organic compounds through covalent bonds or coordinate bonds. Examples of such a polyvalent metal atom include Al, Cr, Zr, Co, Cu, Fe, Ni, V, Zn, In, Ca, Mg, Mn, Y, Ce, Sr, Ba, Mo, La, SN and Ti. As an example of the atom in an organic compound forming a covalent bond or a coordinate bond, mention may be made of an oxygen atom. And examples of such an organic compound include alkyl esters, alcohol compounds, carboxylic acid compounds, ether compounds, ether compounds and ketone compounds. In the present invention, it is preferable to use a cross-linking agent of isocyanate type.

There is no particular restriction on the isocyanate-type cross-linking agent used in the foregoing adhesive composition so far as the agent is a compound having at least two isocyanagte groups per molecule. Examples of a compound usable as the isocyanate-type cross-linking agent include isocyanates, such as tolylene diisocyanate, 4-4'-diphenylmethane diisocyanate, hexamethylene diisocyanate, xylylene diisocyanate, naphthylene-1,5-diisocyanate, o-toluidine isocyanate, isophorone diisocyanate and triphenylmethane triisocyanate, products of reaction between those isocyanates and polyhydric alcohol compounds, and polyisocyanates produced by condensation of isocyanates. The trade names of those isocyanates on the market are Coronate L, Coronate HL, Coronate 2030, Coronate 2031, Millionate MR and Millionate MTL, which are produced by Nippon Polyurethane Industry Co., Ltd.; Takenate D-102, Takenate D-110N, Takenate D-200 and Takenate D-202, which are produced by Takeda Pharmaceutical Company Limited; Desmodule L, Desmodule IL, Desmodule N and Desmodule HL, which are produced by Sumitomo Bayer Urethane Co., Ltd.; and so on. Additionally, these products can be used alone or as combinations of two or more thereof. There is no particular limit to the mixing ratio of an acrylic polymer to an isocyanate-type cross-linking agent, but the isocyanate-type cross-linking agent is mixed in a proportion of about 0.05 to 6 parts by weight, preferably about 0.1 to 3 parts by weight with respect to 100 parts by weight of the acrylic polymer (in a state of solid matter).

In the foregoing adhesive composition, a tackifier, a plasticizer, fillers made of glass fiber, glass beads, metal powder and other inorganic powders, pigment, a coloring agent, a bulking agent, an antioxidant, an ultraviolet absorbent and a silane coupling agent can further be used, if needed. In addition, various additives can also be used as appropriate within the scope of the intended purposes of the present invention. Moreover, the foregoing adhesive composition may contain fine particles and be formed into an adhesive layer showing a light diffusing property. In the present invention, the addition of a silane coupling agent is suitable for the purpose of adjusting adhesive strength.

Examples of a silane coupling agent usable for the foregoing purpose include vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl) ethyltrimethoxysilane, γ-chloropropylmethoxysilane, vinyltrichlorosilane, γ-mercaptopropyltrimethoxysilane, γ-aminopropyltriethoxysilane, and N-β(aminoethyl)-γ-aminopropyltrimethoxysilane. These silanes can be used alone or as mixtures of two or more thereof. It is required in the present invention to add such a silane coupling agent in a proportion ranging generally from 0.01 to 5.0 parts by weight, preferably from 0.03 to 2.0 parts by weight with respect to 100 parts by weight of the foregoing acrylic polymer (in a state of solid matter).

Although the adhesive layer is not particularly limited as to the formation method thereof, it is formed using, e.g., a method of coating an adhesive composition (in a solution state) on one side or both sides of an optical film and then drying the composition coated, or a method of forming an adhesive layer on a release film by application and drying of an adhesive composition, irradiating the adhesive composition with UV and so on, placing the release film on one side or both sides of an optical film through the adhesive layer, and then peeling the release film from the adhesive layer, thereby transferring the adhesive layer to the optical film. In these methods, the adhesive composition to be applied to the optical film or the release film may be irradiated with a proper amount of UV in advance, if needed.

The drying temperature of the adhesive layer is appropriately regulated depending on the type of an adhesive composition, and is generally from 70 to 150° C. And the drying time is preferably from 1 to 5 minutes. The thickness of the adhesive layer (after drying) has no particular limits, but it is preferable that the thickness is from 5 to 50 µm. When the thickness is thinner than 5 µm, the adhesive layer tends to peel off and cause a durability problem. On the other hand, it is undesirable that the adhesive layer has a thickness increased beyond 50 µm when applied to an optical film designed in consideration of re-peelability, because the adhesive layer comes to have too high adhesive strength. When the polymerization method utilizing UV irradiation is adopted, however, it is possible to form an adhesive layer with a thickness of from 100 µm to 1 mm, and it is preferable that the thickness is adjusted to the range of 200 to 800 µm. The formation of a relatively thick adhesive layer as described above enhance the ability to cushion shocks, so that the adhesive layer can absorb shocks caused by bumps or the like at the time that it is stuck on another optical film such as a panel, and thereby fracture prevention effect is enhanced.

Figure 2A:
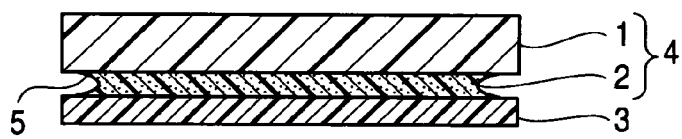
FIG. 2A to FIG. 2D are schematic views showing examples of cross-sectional profiles of adhesive layers in adhesive-type optical films according to the present invention.
Figure 2B:
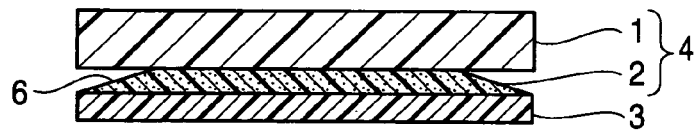
Figure 2C:
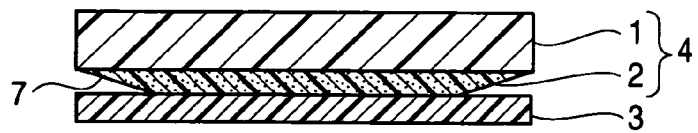

In the present invention, at least a portion of the adhesive layer's edge is located on the inside of the edge lines of an optical film laminated on the adhesive layer (such a portion of the adhesive layer's edge is referred to as "inside edge"). The adhesive layer in such a situation generally has a cross-sectional profile shown, e.g., in FIG. 1A. However, as shown in FIG. 2A to 2D, the adhesive layer can also be shaped so as to have such a cross-sectional profile that a portion of the edge of the adhesive layer 2 extends in cross section to the vicinity of the edge line of the optical film 1 or the layer 3, namely an outwardly extending cross-sectional profile. The part having an outwardly extending profile, or the edge of the adhesive layer 2 contacting the optical film 1 or the layer 3, may be present in the vicinity of edge line of the optical film 1 or the layer 3 as far as it does not protrude from the edge line. In other words, the part having an outwardly extending profile is sufficient to be situated inward by 0 µm or more from edge lines of the optical film 1. Further, it is preferable that the part having an outwardly extending profile is situated inward by 5 to 50 µm from edge lines of the optical film 1, because the adhesive layer having such a cross-sectional profile becomes more resistant to adhesive chips. In FIG. 2A, a concave end face 5 having a concave cross-sectional profile is formed. In FIG. 2B and FIG. 2C, slant end faces 6 and 7 having slant cross-sectional profiles are formed. It is preferable to form an adhesive layer having the cross-sectional profile shown in FIG. 1A, FIG. 2A or FIG. 2C (wherein the slant end face 7 of the adhesive layer has a cross-sectional profile extending outwardly in a direction going from the layer 3 side to the optical film 1 side) from the view point of preventing the adhesive chip. Further, in a case where the adhesive-type optical film has two or more adhesive layers, as shown in FIG. 3A or FIG. 3B, it is possible to determine the presence or absence of the portion and the shape of a portion located on the inside of an edge line of the optical film.

Figure 2D:
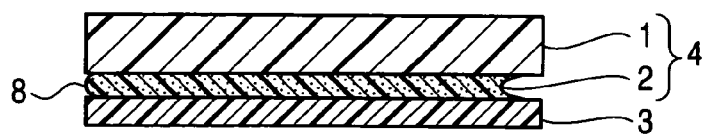

Although it is effective as long as the edge of the adhesive layer located on the inside of optical film's edge lines is formed on at least a portion of the optical film's edges, the greater the proportion of the edge of the adhesive layer located on the inside of the optical film's edge lines with respect to the total edge thereof, the higher the effect. More specifically, it is preferable that, in accordance with the shape of an optical film, the inside edge of the adhesive layer is formed one-half or more of the total perimeter of the optical film, preferably three-quarter or more thereof, more preferably the whole of the edges thereof. Additionally, the cross-sectional profile of the adhesive layer's edge located on the inside of the optical film edge lines may vary from one edge section to another as shown in FIG. 2D. In the adhesive-type optical film of FIG. 2D, the convex end face 8 having a convex cross-sectional profile is formed in addition to the concave end face 5.

Examples of a method for providing the edge of an adhesive layer located on the inside of optical film's edge lines include a method of designing so as to form an adhesive layer in a region lying inward at a proper distance from the edge lines of an optical film stamped at the time of coating or transfer, and a method of removing only part of the adhesive layer after coating or transferring the adhesive layer (a cut-half method). In the adhesive-type optical film having optical films laminated on both sides of an adhesive layer, on the other hand, the optical films or release films between which the adhesive layer is sandwiched may be different in size. Therefore, as shown in FIG. 1B, an adhesive layer may be formed on the surface of a release film or an optical film having a smaller area than an optical film to be provided with the adhesive layer, and thereon the optical film larger in size may be laminated. In the case of using the release film smaller in area, the structure as shown in FIG. 1A can be formed by peeling the release film away from an adhesive layer and then laminating an optical film larger in size on the adhesive layer.

Regarding a distance between the edge line of an optical film and the edge line of an adhesive layer's edge located on the inside of the optical film's edge line (the longest interval), in the case of the distance is too long, problems in regard to display may be caused in forming the adhesive layer on, e.g., a liquid-crystal panel with a narrow-width frame which has become prevalent in recent years; while, when the distance is too short, the effect on prevention of adhesive chips and contaminations, which is achieved by the present invention, becomes hard to achieve. Therefore, it is required to adjust the distance as appropriate depending on the end use purposes. In general, this distance is preferably from 10 to 300 µm, more preferably from 20 to 250 µm, still more preferably from 50 to 150 µm.

In the case of an adhesive-type optical film having optical films laminated on both sides of an adhesive layer, there is a method of applying a pressure to the adhesive-type optical film with the adhesive layer interposed between two optical films from the both sides (wherein is included the case of fixing one side and applying pressure to the other side alone) to extrude part of the adhesive layer from an edge of a side surface of the optical film, shaving off or cutting away the pushed-out portion of the adhesive layer and then releasing the pressure to the adhesive layer, thereby letting the adhesive layer's ends sink inwardly from the optical film edge lines. Adhesives suitably used in the case of adopting such a method are rather elastic adhesives, because the more easily the adhesive layer returns to its original shape upon release from pressure, so much the better. As to the elasticity modulus of an adhesive used in this case, it is preferable that the storage modulus at 25° C., which is determined from a dynamic viscoelasticity, is from $1.0 \times 10^4$ to $1.0 \times 10^7$ Pa, more preferably from $1.0 \times 10^4$ to $1.0 \times 10^6$ Pa. Alternatively, it is preferable that the loss modulus at 25° C., which is determined from a dynamic viscoelasticity, is from $1.0 \times 10^2$ to $1.0 \times 10^7$ Pa, more preferably from $1.0 \times 10^3$ to $1.0 \times 10^5$ Pa. For determination of those values, measurements with a viscoelasticity measuring apparatus (ARES, made by Rheometric Scientific F. E. Inc.) are carried out in the temperature range of from −50° C. to 150° C. and the measured value at 25° C. is taken.

As another method for letting the adhesive layer's ends sink inwardly from the optical film's edge lines, it is possible to adopt a method of pulling one side or both sides of the adhesive-type optical film, in which an adhesive layer is sandwiched, outward in the thickness direction of the adhesive layer. As an adhesive used in this case, an adhesive that is easy to show a plastic deformation by force is preferable. So a rather viscous adhesive is preferably used.

In the case of, as mentioned above, applying a pressure to an adhesive-type optical film having optical films laminated on both sides of an adhesive layer and then shaving off or cutting away the adhesive layer pushed out, it is preferable from the view point of productivity that the adhesive layer is shaved or cut together with the optical films. Examples of ways to adjust the distance from the optical film edge to the adhesive layer's edge located on the inside of the optical film in the case of adopting the method of shaving or cutting the adhesive-type optical film after application of pressure includes a method of controlling the amount of adhesive layer shaved off (cut away) in shaving off or cutting away the pushed-out portion of the adhesive layer, a method of controlling the pressure applied to the adhesive layer, and a method of regulating the elastic modulus of the adhesive layer.

Examples of a method of forming the adhesive layer having a cross-sectional profile as shown in FIG. 2C include a method of cutting out half of the adhesive layer's edge at a bevel in cross section, the method of applying pressure to an adhesive-type optical film as mentioned above and shaving off the adhesive layer at a bevel in cross section (so that the adhesive layer comes to have the cross-sectional profile as shown in FIG. 2C after release from the pressurized condition), and the method of forming an adhesive layer on an optical film so as to have a protrusion on the central area of the optical film and then laminating a release film or an optical film on the adhesive layer. Moreover, such a cross-sectional profile may be formed when two films between which an adhesive layer is sandwiched have remarkably different interfacial properties.

Additionally, ultraviolet absorbency may be imparted to optical films and adhesive layers used in the present invention according to a method of treating them, e.g., with ultraviolet absorbents, such as salicylate compounds, benzophenol compounds, benzotriazole compounds, cyanoacrylate compounds and nickel complex compounds.

The optical films are optical films used in forming image display devices and have no particular restrictions as to their kinds. Examples thereof include a polarizing plate, a retardation plate, an elliptically polarizing plate, a viewing angle compensating film, and a brightness enhancement film.

The polarizing plate used generally as the foregoing optical film is a polarizing plate having a transparent protective film on one side or both sides.

The polarizer used therein has no particular restriction, and it may be various in kind. Examples thereof include films prepared by adsorbing a dichromatic substance, such as iodine or a dichromatic dye, to hydrophilic polymer films, such as polyvinyl alcohol film, partially formalated polyvinyl alcohol film and partially saponified ethylene-vinyl acetate copolymer, and then subjecting the films to uniaxial drawing, and oriented polyene films, such as dehydration products of polyvinyl alcohol and dehydrochlorination products of polyvinyl chloride. Among them, the polarizer comprising polyvinyl alcohol film and a dichromatic substance like iodine is preferable. The thickness of such a polarizer has no particular limits, but it is generally from 5 to 80 μm.

The polarizer of polyvinyl alcohol film dyed with iodine and drawn uniaxially can be made, e.g., by dyeing polyvinyl alcohol by immersion in an aqueous iodine solution and drawing the dyed film to 3 to 7 times its original length. The polyvinyl alcohol film may contain boric acid, zinc sulfate, zinc chloride or the like, if needed, and can be immersed in an aqueous solution of potassium iodide or the like. In advance of dyeing, the polyvinyl alcohol film may further be washed by immersion in water as required. By washing the polyvinyl alcohol film with water, stains on the polyvinyl alcohol film surface and a blocking inhibitor can be cleaned and, what is more, the polyvinyl alcohol film swells up and comes to have effect of preventing unevenness, such as uneven dyeing. The drawing may be carried out after or while dyeing with iodine, or the dyeing with iodine may be carried out after drawing. Alternatively, the drawing can be carried out in an aqueous solution of boric acid or potassium iodide, or in a water bath.

As the material forming a transparent protective film provided on one side or both sides of the polarizer, a material excellent in transparency, mechanical strength, thermal stability, imperviousness to water, isotropy and so on is suitable. Examples of such a material include polymers of polyester type, such as polyethylene terephthalate and polyethylene naphthalate; polymers of cellulose type, such as diacetyl cellulose and triacetyl cellulose; acrylic polymers, such as polymethyl methacrylate; styrene polymers, such as polystyrene and acrylonitrile-styrene copolymer (AS resin); and polymers of polycarbonate type. Further, polyolefin-type polymers, such as polyethylene, polypropylene, polyolefin having a cyclic or norbornene structure and ethylene-propylene copolymer; vinyl chloride polymers; amide polymers including nylon and directional polyamide; imide polymers; sulfone polymers; polyethersulfone polymers; polyether ether ketone polymers; polyphenylene sulfide polymers; vinyl alcohol polymers; vinylidene chloride polymers; vinyl butyral polymers; arylate polymers; polyoxyethylene polymers; epoxy polymers; and blends of two or more of the polymers recited above can be given as other examples of a polymer forming the foregoing transparent protective film. Furthermore, the transparent protective film can also be formed as a cured layer of thermosetting or UV-curable resin of acrylic, urethane, acrylurethane, epoxy or silicone type. Among them, the polymers containing hydroxyl groups having reactivity with isocyanate cross-linking agents are preferable, more preferably cellulose-type polymers. The thickness of a transparent protective film has no particular limits, but it is generally 500 μm or less, preferably from 1 to 300 μm, more preferably from 5 to 200 μm.

As examples of a transparent protective film, mention may be made of the polymer films described in JP 2001-343529 A (WO 01/37007), such as films of resin compositions containing (A) a thermoplastic resin having a substituted and/or unsubstituted imido group in their side chain and (B) a thermoplastic resin having a substituted and/or unsubstituted phenyl group and a nitrile group in their side chain, and specifically, a film of a resin composition containing an alternating copolymer of isobutene and N-methylmaleimide and an acrylonitrile-styrene copolymer. The mixed extrusion products of such resin compositions can be used as the films.

The thickness of such a transparent protective film has no particular limits, but it is generally 500 μm or below, preferably from 1 to 300 μm, more preferably from 5 to 200 μm. In addition, it is preferable from the viewpoints of polarization characteristics and durability that the protective film surface be saponified with an alkali or the like.

In addition, it is preferable that those transparent protective films have a less coloring as far as possible. So it is preferable to use a transparent protective film whose retardation value in the film thickness direction, which is expressed by $Rth=[(nx+ny)/2-nz]\cdot d$ (nx and ny are in-plane main refractive indices, nz is a thicknesswise refractive index, and u is a layer thickness), is from −90 nm to +75 nm. By use of a transparent protective film having such a retardation value in thickness direction (Rth) from −90 nm to +75 nm, coloring of a polarizing plate (optical coloring) due to a transparent protective film can be nearly resolved. The retardation value in the thickness direction (Rth) is preferably from −80 to +60 nm, more preferably from −70 nm to +45 nm.

The side of a transparent protective film, which is not the side on which a polarizing plate is stuck (the aforementioned coating layers are not provided), may have a hard coat layer and may be subjected to a treatment such as antireflection treatment, sticking prevention, treatment for the purpose of diffusion or antiglare.

The hard coat treatment is given for the purposes including scratch prevention on the polarizing plate surface, and a hard coat can be formed according to a method in which a cured film made from an appropriate UV-curable resin of, e.g., acrylic or silicone type and excellent in hardness and slipping properties is attached to a transparent protective film surface. The antireflection treatment is given for the purpose of prevention of reflections of extraneous light from the polarizing plate surface, and can be achieved, e.g., by forming an antireflection coating in accordance with a usual method. The sticking prevention treatment is given for the purpose of prevention of sticking to an adjacent layer.

And the antiglare treatment is given for the purpose of, e.g., preventing visual recognition of the light transmitted by a polarizing plate from being inhibited by reflections of extraneous light from the polarizing plate surface, and can be achieved by forming a finely uneven structure on the transparent protective film surface in accordance with an appropriate method, such as a surface roughening method utilizing a sandblasting process or an embossing process, or a method of mixing transparent fine particles. The fine particles incorporated for forming a finely uneven structure are transparent fine particles having an average particle diameter of 0.5 to 50 μm, which include inorganic fine particles, which may be conductive, such as silica, alumina, titania, zirconia, tin oxide, indium oxide, cadmium oxide or antimony oxide, and organic fine particles made of a crosslinked polymer or a uncrosslinked polymer. The amount of fine particles used in forming a finely uneven surface structure is generally from 2 to 50 parts by weight, preferably from 5 to 25 parts by weight with respect to 100 parts by weight of the transparent resin forming the finely uneven surface structure. The antiglare layer may also serve as a diffusion layer for enlarging a visual angle by diffusing the light transmitted by a polarizing plate (a visual angle enlarging function).

Incidentally, the antireflection layer, the sticking prevention layer, the diffusion layer and the antiglare layer can be incorporated in a transparent protective film itself, and alternatively, those layers may be provided as optical layers independently of a transparent protective film.

The treatment for bonding a transparent protective film to the polarizing plate has no particular restriction, but it can be performed with the aid of an adhesive including a vinyl polymer, or an adhesive including at least a water-soluble cross-linking agent for vinyl alcohol polymers, such as boric acid or borax, glutaraldehyde or melamine, or oxalic acid. This adhesive layer can be applied, e.g., by coating and drying an aqueous solution in layer form, and other additives and a catalyst such as an acid can be mixed in preparing the aqueous solution.

In putting the present optical film to practical use, other optical layer can be laminated thereon. Although no particular limitation is imposed on such an optical layer, examples thereof include one layer or a combination of at least two layers selected from optical layers that have ever been used for making liquid crystal display devices, such as a reflector and a semitransmissive plate, a retardation plate (including ½ and ¼ wavelength plates) and a viewing angle compensating film. For instance, especially preferred is a reflective polarizing plate or a semi-transmissive polarizing plate formed by laminating a reflector or a semi-transmissive reflector on a polarizing plate, an elliptically polarizing plate or a circularly polarizing plate formed by laminating a retardation plate on a polarizing plate, a wide viewing angle polarizing plate formed by further laminating a viewing angle compensating film on a polarizing plate, and a polarizing plate formed by laminating a brightness enhancement film on a polarizing plate.

The reflective polarizing plate is a polarizing plate provided with a reflective layer, and used, e.g., for forming a liquid crystal display of the type which permits displays through reflections of incident light from the visual recognition side (display side), thereby enabling omission of a built-in light source like a backlight and offering an advantage that a low-profile liquid crystal display can be designed with ease. The reflective polarizing plate can be formed using an appropriate method, such as a method of providing a reflective layer made of metal or the like on one side of a polarizing plate, if necessary, via a transparent protective layer or so on.

As an example of a reflective polarizing plate, mention may be made of a reflective polarizing plate including a reflective layer formed by attaching a foil or deposition film of a reflective metal, such as aluminum, to one side of a transparent protective film whose surface is rendered mat as required. As another example of a reflective polarizing plate, mention may be made of a reflective polarizing plate including a reflective layer with a finely uneven structure formed on the transparent protective film in which fine particles are incorporated so as to let its surface have a finely uneven structure. The reflective layer with a finely uneven structure has an advantage of capable of diffusing incident light by scatter reflections to result in prevention of directivity and glaring appearance and enabling the control of unevenness coming from variations of light and shade. Moreover, the fine particles-containing transparent protective film has an advantage in that incident light and the reflected light thereof are diffused upon passage through the film and thereby unevenness coming from variations of light and shade can further be controlled. The reflective layer with a finely uneven structure reflecting the finely uneven structure of the transparent protective film surface can be formed in accordance with, e.g., a method of directly attaching a metallic layer to the surface of a transparent protective film by an appropriate process, such as an evaporation process or a plating process, more specifically a vacuum evaporation process, an ion plating process or a sputtering process.

Instead of the method of directly attaching to a transparent protective film of the foregoing polarizing plate, the reflector can be used in the form of a reflective sheet having a reflective layer provided on an appropriate film conforming to the transparent film. Incidentally, the reflective layer is generally made of a metal, so it is preferable for the layer to be used in the form that its reflection face is covered with a transparent protective film, a polarizing plate or so on from the viewpoints of not only preventing the reflectivity from lowering by oxidation but also long-term continuation of the initial reflectivity, and avoidance of a separately attached protective layer.

On the other hand, the semi-transmissive polarizing plate can be obtained by adopting a reflective layer of semi-transmissive type, such as a half mirror capable of not only reflecting light by its reflective layer but also transmitting light, in the foregoing description. The semi-transmissive polarizing plate is generally provided on the back of a liquid-crystal cell, and can form, e.g., a liquid crystal display of the type which displays images by reflecting incident light from the visual recognition side (display side) in the case of using the liquid crystal display in the relatively well-lighted atmosphere, while which displays images by use of a built-in light source, such as a backlight incorporated on the back of the semi-transmissive polarizing plate, in the relatively dark atmosphere. In other words, the semi-transmissive polarizing plate is useful in forming, e.g., a liquid crystal display of the type which can save the energy for using a light source, such as a backlight, in the well-lighted atmosphere and further permits display by use of a built-in light source in a relatively well-lighted atmosphere.

The circularly or elliptically polarizing plate in which a retardation plate is further laminated on a polarizing plate is explained below. When linear polarized light is converted to circularly or elliptically polarized light, circularly or elliptically polarized light is converted to linear polarized light, or the polarizing direction of linear polarized light is changed, a retardation plate is used. As the retardation plate used for converting linear polarized light to circularly polarized light or circularly polarized light to linear polarized light, the ¼ wavelength plate (also referred to as a λ/4 plate) is employed. And a ½ wavelength plate (also referred to as a λ/2 plate) is generally used in the case of changing the polarizing direction of a linear polarized light.

The elliptically polarizing plate is used effectively, e.g., in the case of compensating (preventing) coloring (blue or yellow coloring) caused by birefringence in the liquid-crystal layer of a liquid crystal display of super twisted nematic (STN) type and permitting black-and-white display without the foregoing coloring. Further, the polarizing plate capable of controlling a three-dimensional refractive index is preferable because it can also compensate (prevent) coloring occurring when the screen of a liquid crystal display is viewed from an oblique direction. The circularly polarizing plate is used effectively, e.g., in the case of adjusting color tone of pictures on a reflective liquid crystal display permitting display of images in color, and has an anti-reflecting function also.

Examples of a retardation plate include birefringent films prepared by subjecting polymeric materials to uniaxial- or biaxial-drawing treatment, oriented films of liquid-crystal polymers and oriented liquid-crystal polymer coatings supported by films. The drawing treatment can be performed according to, e.g., a roll drawing method, a long-gap follow drawing method, a tenter drawing method and a tubular drawing method. The draw ratio is generally from 1.1 to 3 in the case of uniaxial drawing. The thickness of a retardation plate has no particular limits, but it is generally from 10 to 200 μm preferably from 20 to 100 μm.

Examples of a polymeric material include polyvinyl alcohol, polyvinyl butyral, polymethylvinyl ether, polyhydroxyethyl acrylate, hydroxyethyl cellulose, hydroxypropyl cellulose, methyl cellulose, polycarbonate, polyallylate, polysulfone, polyethylene terephthalate, polyethylene naphthalate, polyethersulfone, polyphenylene sulfide, polyphenylene oxide, polyallylsulfone, polyvinyl alcohol, polyamide, polyimide, polyolefin, norbornene structure-containing polyolefin, polyvinyl chloride, cellulose polymers, various co- or terpolymers of binary or ternary combinations of monomers constituting the above-recited homopolymers, graft copolymers, and blends of two or more of the above-recited ones. These polymeric materials can be formed into oriented materials (drawn films) by drawing or so on.

Examples of a liquid-crystal polymer include a wide variety of polymers having main chains or side chains into which conjugated linear atomic groups capable of imparting liquid-crystal orientation (mesagen) to the polymers are introduced, which are therefore referred to as main-chain type or side-chain type liquid crystal polymers, respectively. Examples of a main-chain type mesomorphic polymer include mesomorphic polymers of nematic orientational polyester type, discotic polymers and cholesteric polymers, which have a structure that mesagen groups form bonds in the spacer portions that can provide flexibility. Examples of a side-chain type mesomorphic polymer include polymers containing polysiloxane, polyacrylate, polymethacrylate and polymalonate as their respective main-chain skeletons and further having as side chains mesagen portions including para-substituted cyclic compound units capable of providing nematic orientation via spacer portions made up of conjugated atomic groups. These liquid-crystal polymers are used in a state that a solution of each mesomorphic polymer is spread over the substrate surface having undergone orientation treatment, such as the rubbed surface of a thin polyimide or polyvinyl alcohol film formed on a glass plate or silicon oxide formed by oblique evaporation, and heat-treated.

The retardation plate may have a retardation adjusted appropriately depending on what purpose it is used for, more specifically the purpose of compensating coloring and visual angle ascribable to birefringence of various wavelength plates and liquid-crystal layers. In addition, two or more of retardation plates may be stacked on top of each other in layers and thereby optical characteristics including a retardation may be controlled.

The elliptically polarizing plate or the reflective elliptically polarizing plate is a laminate formed of an appropriate combination of a retardation plate and a polarizing plate or a reflective polarizing plate. Such an elliptically polarizing plate can be formed by the (reflective) polarizing plate and the retardation plate being independently stacked one after another so as to make a combination in the course of manufacturing a liquid crystal display. However, as mentioned above, an optical film made in advance, such as an elliptically polarizing plate, is superior in consistency of quality, lamination workability and so on, and has an advantage of enhancing the efficiency of liquid crystal display production.

The viewing angle compensating film is a film for widening a viewing angle so that images are visible with relatively high sharpness even when the screen of a liquid crystal display is viewed from somewhat oblique directions but not a direction vertical to the screen. Such a viewing angle compensating retardation plate includes, e.g., a retardation plate and an oriented film of, e.g., a liquid-crystal polymer or an oriented layer of, e.g., a liquid-crystal polymer supported by a transparent substrate. While a polymer film having birefringence caused by uniaxial drawing in its in-plane direction is used for a general retardation plate, retardation plates used as viewing angle compensating films include, e.g., a polymer film having birefringence caused by biaxial drawing in its in-plane direction, a polymer film having undergone not only uniaxial drawing in its in-plane direction but also drawing in its thickness direction and thereby having birefringence with a refractive index controlled in the thickness direction, and a two-direction drawn film such as an obliquely oriented film. Examples of an obliquely oriented film include a polymer film that is bonded to a thermally shrinkable film and then subjected to drawing treatment or/and shrinking treatment under action of the shrinking force by heating, and a film of obliquely oriented liquid-crystal polymer. The polymer used as a material source of the retardation plate includes the same polymers as recited in the foregoing description of the retardation plate, and the polymers appropriate for the purpose of prevention of coloring ascribed to a visual recognition angle change arising from a retardation caused by a liquid-crystal cell and the purpose of expansion of a visual angle for good visual recognition can be used.

In addition, from the viewpoint of achieving, e.g., a wide visual angle for good visual recognition, an optical compensation retardation plate including an optically anisotropic layer made up of an oriented liquid-crystal polymer layer, especially an obliquely oriented discotic liquid-crystal polymer layer, supported by triacetyl cellulose film is used to advantage.

The polarizing plate prepared by laminating a brightness enhancement film on a polarizing plate is generally used in a state that it is provided on the rear side of a liquid-crystal cell. The brightness enhancement film exhibits a characteristic that it reflects linearly light polarized along a specified polarization axis or circularly polarized light in a specified direction and transmits the other light when backlight of a liquid crystal display and natural light coming from reflection by the rear side is incident to the film surface. When light from a light source, such as a backlight, is incident to the polarizing plate having a brightness enhancement film laminated on a polarizing plate, therefore, the polarizing plate allows light in a state of specified polarization to pass through and, at the same time, reflects the light out of the state of specified polarization without transmitting them. The light reflected by the brightness enhancement film surface are further reversed by a reflective layer or the like placed on the rear side and incident again on the brightness enhancement film, part or all of the incident light are allowed to pass through in the state of specified polarization state, thereby effecting not only an increase of the amount of light transmitted by the brightness enhancement film but also a supply of polarized light less prone to being absorbed by the polarizing plate. As a result, it becomes possible to increase the amount of light utilizable for display of liquid-crystal images or the like and thereby enhance the brightness. In other words, when light is admitted via a polarizing plate provided with no brightness enhancement film from the rear side of a liquid crystal cell by use of a backlight or the like, light polarized in directions discordant with the polarization axis of the polarizing plate are mostly absorbed by the polarizing plate and little transmitted by the polarizing plate. More specifically, depending on the characteristics of a polarizing plate used, about 50% of the light is absorbed by the polarizing plate, the light amount utilizable for display of liquid-crystal images or the like is reduced so much and the images displayed are dark. The brightness enhancement film avoids admitting the light polarized in such directions as to allow absorption by a polarizing plate into the polarizing plate, so such light are once reflected by the brightness enhancement film and further reversed via, e.g., a reflective layer provided on the rear side and incident again to the brightness enhancement film. Through a repeat of this process, the brightness enhancement film permits transmission of only the light that have come to be polarized in such directions as to allow passage through the polarizing plate while undergoing reflection and reversal between those two members, resulting in supply of light to the polarizing plate. Therefore, the light from a backlight or the like can be utilized efficiently in displaying images on a liquid crystal display and the display screen can be made bright.

A diffusing plate can also be provided between the brightness enhancement film and the reflective layer or the like. The light reflected by the brightness enhancement film and be in a polarized state travel toward the reflective layer or the like and, when they pass through the diffusing plate provided, those light are diffused uniformly and at the same time their polarized state is dissolved; as a result, the light are changed to an unpolarized state. In other words, the light is restored to the state of natural light. These light of light in an unpolarized state, or the state of natural light, travel to the reflective layer or the like, and they are reflected via the reflective layer or the like, passed again through the diffusing plate and admitted again into the brightness enhancement film. The process mentioned above is repeated. By providing a diffusing plate for restoring to the state of natural light, unevenness in brightness of the display screen can be reduced as the brightness of the display screen is maintained, so a uniform and bright screen can be obtained. More specifically, it is thought that the reflection of initial incident light is increased properly in number of repetitions by providing a diffusing plate for restoring to the state of natural light, and this effect and the diffusion function of the diffusing plate combined make it possible to provide a uniform and bright display screen.

Examples of a brightness enhancement film usable herein include films having such a characteristic as to transmit light of light polarized linearly along a specified polarization axis and reflect the other light, such as a thin multilayer film of dielectric and a multilayer laminate of thin films differing in refractive index anisotropy, and films having such a characteristic as to reflect either right-handed or left-handed circularly polarized light and transmit the other light, such as oriented films of cholesteric mesomorphic polymers and oriented liquid-crystal layers supported by film substrates.

Therefore, in the case of using the foregoing brightness enhancement film of the type which transmits light polarized linearly along a specified polarization axis, the light transmitted thereby are admitted into a polarizing plate as they are in a state that their polarization axes are aligned, so absorption loss attributed to the polarizing plate can be controlled and efficient transmission can be achieved. On the other hand, in the case of using the brightness enhancement film of the type which transmits light of light polarized circularly, such as a cholesteric liquid-crystal layer, the transmitted light of light can be admitted into a polarizing plate as they are, but it is preferable form the viewpoint of absorption loss control that the circular polarized light of light are changed to a linear polarized state via a retardation plate and then admitted into a polarizing plate. Incidentally, the use of a ¼ wavelength plate as the retardation plate enables conversion of circularly polarized light to linear polarized light.

The retardation plate functioning as a ¼ wavelength plate in a wide wavelength region, such as the visible-light region, can be obtained in a way that a retardation layer performing a function as a ¼ wavelength plate on monochromatic light having a wavelength of 550 nm is superposed upon another retardation layer having a different retardation characteristic, such as a retardation layer functioning as a ½ wavelength plate. Therefore, the retardation plate arranged between a polarizing plate and a brightness enhancement film may be a retardation plate including one retardation layer or a combination of two or more of phase-different layers.

Additionally, the cholesteric liquid crystal layer reflecting circular polarized light of light in a wide wavelength region, such as the visible-light region, can be obtained by configuring a combination of two or at least three layers differing in wavelength of reflected light so as to superpose one layer upon another and, on this basis, transmission circularly polarized light in a wide wavelength region can be obtained.

Moreover, the polarizing plate may be a laminate of a polarizing plate and two or more optical layers, such as the aforementioned polarizing plate of polarization separation type. Therefore, the polarizing plate may be an reflective elliptically polarizing plate or an semitransmissive elliptically polarizing plate which is formed by combining a retardation plate with the foregoing reflective polarizing plate or semi-transmissive polarizing plate, respectively.

The optical film having the foregoing optical layers on a polarizing plate in a laminated state can be formed in a way that the optical layers are stacked independently on the polarizing plate one after another in the course of manufacturing a liquid crystal display or the like. However, the optical layers/polarizing plate combination laminated in advance into an optical film is superior in consistency of quality, assembly workability and so on, and has an advantage of improving the manufacturing process of liquid-crystal display device. For the lamination, an appropriate bonding technique, such as an adhesive layer or the like, can be adopted. In sticking the polarizing plate on another optical layer, it is possible to make their optical angles form an appropriate angle of arrangement depending on the intended retardation characteristics.

Figure 4A:
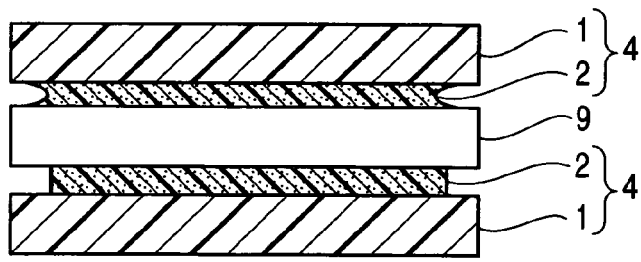
FIG. 4A is an example of an image display device constructed by using the adhesive-type optical films shown in FIG. 1A and FIG. 2A.
Figure 4B:
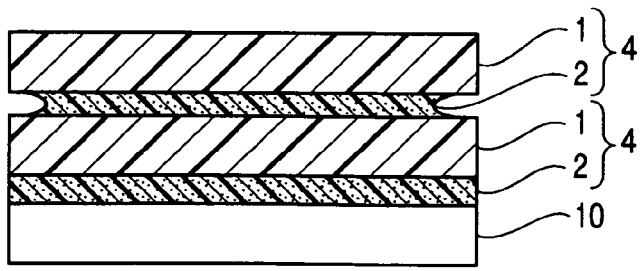
FIG. 4B is an example of an image display device constructed by using the adhesive-type optical film shown in FIG. 3A.

The present adhesive-type optical films can be used to advantage in forming image display device, inclusive of a liquid crystal display (LCD), an electroluminescence display (ELD), a plasma display panel (PDP) and a field emission display (FED). FIG. 4A shows an example of a liquid crystal display formed by sticking the adhesive-type optical films shown in FIG. 1A and FIG. 2A on both sides of a liquid crystal cell 9. FIG. 4B shows an example of an electroluminescence display formed by sticking the adhesive-type optical film shown in FIG. 3A on one side of a luminous body 10 described hereinafter (an organic electroluminescence panel).

The present adhesive-type optical films can be favorably used for formation of various kinds of apparatus including a liquid crystal display. The formation of a liquid crystal display can be performed according to traditional methods. In general, the liquid crystal display is formed by assembling a liquid crystal cell, adhesive-type optical films and, if needed, other components including a lighting system and further incorporating a driving circuit into the assembly. The present invention has no particular restrictions, except for the use of polarizing plates and optical films according to the present invention, and follows the usual manner. The liquid crystal cell usable herein may be any type, specifically a TN type, an STN type or a π-type.

An appropriate liquid crystal display, such as a liquid crystal display in which an adhesive-type optical film is disposed on one side or both sides of a liquid crystal cell or a liquid crystal display using a backlight or a reflector as a lighting system, can be formed. In such a case, a polarizing plate or an optical film according to the present invention can be placed on one side or both sides of the liquid crystal cell. When the polarizing plates or the optical films are provided on both sides, they may be the same one or different ones. In forming the liquid crystal display, one layer or a combination of at least two layers chosen from appropriate components including a diffusing plate, an antiglare layer, an anti-reflective film, a protective plate, a prism array, a lens array sheet, a light dispersing plate and a backlight is further disposed in a proper position.

Then, the organic electroluminescence device (organic EL display) is described. In general, a luminous body (organic electroluminescence panel) is formed in the organic EL display by stacking on a transparent substrate a transparent electrode, an organic luminescent layer and a metal electrode in succession. Herein, the organic luminescent layer is a laminate of various organic thin films, and there are known structures having various combinations, such as a laminate of a hole injection layer made from a triphenylamine derivative or the like and a light-emitting layer made from a fluorescent organic solid like anthracene, a laminate of such a light-emitting layer and an electron injection layer made from a perylene derivative or the like, and a laminate of the hole injection layer, the light-emitting layer and the electron injection layer as mentioned above.

The organic EL display emits light on a principal that a voltage is placed between the transparent electrode and the metal electrode, holes and electrons are injected into the organic luminescent layer and recombined therein to generate energy, the thus generated energy excites a fluorescent substance, and the excited fluorescent substance emits light when it returns to the ground state. The mechanism of the recombination occurring in midstream is similar to that in the case of general diodes. As can be conceivable from the similarity, the current and the intensity of emitted light exhibit intense nonlinearity attendant on rectification with respect to the applied voltage.

In the organic EL display, at least one electrode is required to be transparent in order to take out the light emission in the organic luminescent layer, so a transparent electrode formed of a transparent conductor, such as indium tin oxide (ITO), is generally used as positive electrode. On the other hand, it is important to use a substance having small work function as negative electrode from the viewpoint of elevation of emission efficiency by easy injection of electrons, so a metal electrode, such as Mg—Ag or Al—Li, is generally used.

In the organic EL display having such a structure, the organic luminescent layer is made of a very thin film whose thickness is of the order of 10 nm. Therefore, light can almost totally pass through the organic luminescent layer as in the case of the transparent electrode. As a result, when the display is in a state of ceasing light emission, the light incident from the surface of a transparent substrate passes through the transparent electrode and the organic luminescent layer, bounces off the metal electrode and goes back to the side of the transparent substrate surface. Therefore, the screen of the organic EL display looks like a specular surface when viewed from the outside.

In the organic EL display including an organic electroluminescence panel provided with not only a transparent electrode on the surface side of an organic luminescent layer capable of emitting light by application of voltage thereto but also a metal electrode on the back of the organic luminescent layer, it is possible to place a polarizing plate on the surface side of the transparent electrode, and besides, a retardation film can be placed between the transparent electrode and the polarizing plate.

The retardation film and the polarizing plate have a function of polarizing light admitted from the outside and reflected from the metal electrode. This polarization function produces an effect that visual recognition of the specular surface of the metal electrode from the outside becomes impossible. When the retardation film is made up of a ¼ wavelength plate in particular, and besides, the angle formed by polarizing directions of the polarizing plate and the retardation film is adjusted to $\pi/4$, the specular surface of metal electrode can be completely shielded.

In other words, only the linear-polarization component of external light admitted into the organic EL display can be passed through by the action of the polarizing plate. Although the linear polarized light is generally converted to elliptically polarized light by use of a retardation film, it can be converted to circularly polarized light by way of exception when a ¼ wavelength plate is used as the retardation film and the angle formed by polarizing directions of the polarizing plate and the retardation film is adjusted to $\pi/4$.

This circularly polarized light passes through a transparent substrate, a transparent electrode and an organic thin film, bounces off a metal electrode, passes again through the organic thin film, the transparent electrode and the transparent substrate, and is converted again to linear polarized light through the retardation film. And this linear polarized light is orthogonal to the polarization direction of the polarizing plate, so it cannot pass through the polarizing plate. As a result, the specular surface of the metal electrode can be perfectly shielded.

As mentioned above, the present invention solves the adhesive chips problem, the adhesive contamination problem and so on by forming portions located on the inside of the optical film's edge lines in adhesive layers included in adhesive-type optical films.

EXAMPLES

The present invention is now illustrated in greater detail with reference to Examples, but it should be understood that the present invention is not to be construed as being limited thereto. Additionally, all parts and percentages in each example are by weight.

Example 1

(Preparation of Acrylic Polymer)

In a separable flask equipped with a thermometer, a stirrer, a reflux condenser and a nitrogen-gas introduction tube, 97 parts of butyl acrylate, 3 parts of acrylic acid, 0.2 parts of azobisisobutyronitrile and ethyl acetate in an amount required for adjusting the solid contents to 30% were set, and then nitrogen replacement was carried out for about 1 hour while admitting nitrogen gas into the flask and stirring the ingredients put in the flask. Thereafter, reaction was run for 7 hours while heating the flask at 60° C. to yield an acrylic polymer having a weight average molecular weight (Mw) of 1,100,000.

(Preparation of Adhesive Composition)

An adhesive composition (in solution form) was prepared by admixing the acrylic polymer prepared in the foregoing manner (100 parts on a solids basis) with 10 parts of butyl acrylate (BA) oligomer (Mw=3,000), 0.8 parts of trimethylolpropane tolylenediisocyanate as a cross-linking agent of isocyanate type (Coronate L, a product of Nippon Polyurethane Industry Co., Ltd.) and 0.1 parts of a silane coupling agent (KBM-403, a product of Shin-Etsu Chemical Co., Ltd.).

(Making of Adhesive-type Optical Film)

An 80 µm-thick polyvinyl alcohol film was drawn fivefold in an aqueous iodine solution, and then dried. Triacetyl cellulose films were bonded to both sides of the thus drawn film through an adhesive to make a polarizing plate. The polarizing plate thus made was stamped into the size of 11 inches by means of a Thomson blade. Then, a coating of the adhesive solution prepared in the foregoing manner was applied to a 35 µm-thick polyethylene terephthalate-based release film of so that the coating after drying had a thickness of 25 µm and a size ensuring the dried coating end to be situated inward by 300 μm from each edge line of the polarizing plate measuring 11 inches in size, and the polarizing plate was laminated on the adhesive coating thus applied, and dried at 100° C. for 4 minutes. Thus, an adhesive-type optical film (an adhesive-type polarizing plate) having the adhesive layer formed in the foregoing manner was obtained.

Example 2

An adhesive-type polarizing plate was made by laminating, on the polarizing plate stamped into the size of 11 inches by means of a Thomson blade as used in Example 1 (for making another adhesive-type optical film), an adhesive-applied release film made by applying a coating of the same adhesive solution as prepared in Example 1 to a 38 μm-thick release film of polyethylene terephthalate-based so as to cover the entire area of 11-inch size and have a dry thickness of 25 μm and then drying the coating at 100° C. for 4 minutes to form an adhesive layer (loss elasticity modulus: $8.0 \times 10^4$ Pa (25° C.)). Fifty sheets of the thus made adhesive-type polarizing plate were stacked on top of each other, and pinched at the top and the bottom with a jig shaped like a vise while controlling pressure so that the adhesive extruded from the edges. In just the pressurized state they were, the adhesive layers were cut together with the optical films at the position 1.0 mm away in an inward direction from each optical-film edge by means of a rotary blade. Thereafter, the stacked sheets were released from the pressure. Thus, an adhesive-type polarizing plate in which each end of the adhesive layer was formed inward by 150 μm (at the longest) from each edge line of the optical film was obtained.

Example 3

An adhesive-type polarizing plate was made by laminating, on the polarizing plate stamped into the size of 11 inches by means of a Thomson blade as used in Example 1 (for making another adhesive-type optical film), an adhesive-applied release film made by applying a coating of the same adhesive solution as prepared in Example 1 to a 38 μm-thick release film of polyethylene terephthalate-based so as to cover the entire area of 11-inch size and have a dry thickness of 40 μm and then drying the coating at 100° C. for 4 minutes to form an adhesive layer (loss elasticity modulus: $1.1 \times 10^3$ Pa (25° C.)). Fifty sheets of the thus made adhesive-type polarizing plate were stacked on top of each other, and pinched at the top and the bottom with a jig shaped like a vise while controlling pressure so that the adhesive extruded from the edges. In just the pressurized state they were, the adhesive extruded out of the optical film edges was cut away with a rotary blade. Thereafter, the stacked sheets were released from the pressure. Thus, an adhesive-type polarizing plate in which each end of the adhesive layer was formed inward by 150 μm (at the longest) from each edge line of the optical film was obtained.

Example 4

An adhesive-type retardation plate in which each end of the adhesive layer was formed inward by 150 μm (at the longest) from each edge line of the optical film was made in the same manner as in Example 3, except that a retardation plate formed by subjecting a norbornene film (ARTON, a product of JSR Corporation) to uniaxial drawing by 1.5 times in the MD direction was used in place of the polarizing plate.

Example 5

In a separable flask, 100 parts of 2-ethylhexyl acrylate and 1 parts of a photo polymerization initiator (Irgacure 184, a product of Ciba Specialty Chemicals) were put, and then irradiated with UV light from a metal halide-added mercury lamp with stirring in a stream of nitrogen gas to prepare an adhesive composition (solution) having a polymerization degree of 10%. A coating of this composition was applied to a 125 μm-thick release film of polyethylene terephthalate-based so as to have a dry thickness of 1 mm, and cured by irradiating the coating with UV light until the residual monomer content became 5% by weight or below. And the residual monomer was eliminated from the cured coating by 30 minutes' drying at 150° C. with a hot-air dryer. Thereafter, in the same manner as in Example 3, the polarizing plate was laminated on the thus treated cured coating, and an adhesive-type polarizing plate in which each end of the adhesive layer was formed inward by 150 μm (at the longest) from each edge line of the optical film was obtained. The loss elasticity modulus of the adhesive layer formed therein was $2.1 \times 10^4$ Pa.

Example 6

An adhesive-type polarizing plate in which each end of the adhesive layer was formed inward by 150 μm (at the longest) from each edge line of the optical film was made in the same manner as in Example 2, except that the amount of the same butyl acrylate (BA) oligomer (Mw=3,000) as used in Example 1 (for making the adhesive composition) was increased to 20 parts and the loss elasticity modulus of the adhesive layer was $4.0 \times 10^4$ Pa (25° C.).

Example 7

An adhesive-type polarizing plate in which each end of the adhesive layer was formed inward by 150 μm (at the longest) from each edge line of the optical film was made in the same manner as in Example 2, except that the amount of the same butyl acrylate (BA) oligomer (Mw=3,000) as used in Example 1 (for making the adhesive composition) was 100 parts and the loss elasticity modulus of the adhesive layer was $7.5 \times 10^3$ Pa (25° C.).

Example 8

An adhesive-type polarizing plate in which each end of the adhesive layer was formed inward by 150 μm (at the longest) from each edge line of the optical film was made in the same manner as in Example 2, except that the amount of the same butyl acrylate (BA) oligomer (Mw=3,000) as used in Example 1 (for making the adhesive composition) was 200 parts and the loss elasticity modulus of the adhesive layer was $1 \times 10^3$ Pa (25° C.)

Example 9

An adhesive-type polarizing plate in which each end of the adhesive layer was formed inward by 55 μm (at the longest) from each edge line of the optical film was made in the same manner as in Example 2, except that the amount of the adhesive layer cut away was moderated.

Example 10

An adhesive-type polarizing plate in which each end of the adhesive layer was formed inward by 100 μm (at the longest)

from each edge line of the optical film was made in the same manner as in Example 2, except that the amount of the adhesive layer cut away was moderated.

Comparative Example 1

An adhesive-type polarizing plate was made by laminating, on the same polarizing plate stamped into the size of 11 inches by means of a Thomson blade as used in Example 1 (for making another adhesive-type optical film), an adhesive-applied release film made by applying a coating of the same adhesive solution as prepared in Example 1 to a 35 μm-thick release film of polyethylene terephthalate-based so as to cover the entire area of 11-inch size and have a dry thickness of 25 am, and then drying the laminate at 100° C. for 4 minutes to form an adhesive layer.

EVALUATIONS (Tacky Feel of Side)
Each of the thus made adhesive-type polarizing plates was checked whether tackiness was felt or not with the touch of a finger on the sides thereof.
(Adhesive Chips)
Fifty sheets of adhesive-type polarizing plate made in each of Examples or Comparative Example were stacked on top of each other, packaged, and then subjected to about 10 hours' transport as they were held on the load-carrying platform of a truck. Thereafter, each of the packages was opened, and the number of sheets suffering adhesive chips of 350 μm or greater was counted.
Evaluation results are shown in Table 1.

TABLE 1

|  | Tacky Feel of Side Surface | Adhesive Chips |
| --- | --- | --- |
| Example 1 | absent | 0/50 |
| Example 2 | absent | 0/50 |
| Example 3 | absent | 0/50 |
| Example 4 | absent | 0/50 |
| Example 5 | absent | 0/50 |
| Example 6 | absent | 0/50 |
| Example 7 | absent | 0/50 |
| Example 8 | absent | 0/50 |
| Example 9 | absent | 0/50 |
| Example 10 | absent | 0/50 |
| Comparative Example 1 | present | 17/50 |

As can be seen from the results set forth in Table 1, the adhesive-type optical films in which each adhesive layer was located on the inside of the optical film's edge lines had no tacky feel on the film's sides and, at the same time, caused no adhesive chips.

While the present invention has been described in detail and with reference to specific embodiments thereof, it will be apparent to one skilled in the art that various changes and modifications can be made therein without departing the spirit and scope thereof.

The present application is based on Japanese Patent Application Nos. 2002-312699 filed on Oct. 28, 2002 and 2003-317383 filed on Sep. 9, 2003 and the contents thereof are incorporated herein by reference.

INDUSTRIAL APPLICABILITY

In accordance with the present invention can be provided an adhesive-type optical film that has an adhesive layer laminated on one side or both sides of an optical film and hardly suffers adhesive chips and adhesive contamination during transport and handling, or on the manufacturing and processing-operation lines.

What is claimed is:
1. An adhesive optical film comprising:
a first optical film;
a first adhesive layer; and
a release film which is a single layer,
wherein the first adhesive layer has a first surface and a second surface opposite to the first surface,
wherein the first optical film is adhered directly upon the first surface of the first adhesive layer and the release film is adhered directly upon the second surface of the first adhesive layer,
wherein a third surface of the first adhesive layer is an outer side edge of the first adhesive layer and the third surface of the first adhesive layer is located on the inside of an outer side edge of the first optical film and the third surface of the first adhesive layer is located on the inside of an outer side edge of the release film, and
wherein the entire area of the first surface and the second surface of the first adhesive layer is sandwiched between the first optical film and the release film.
2. The adhesive optical film according to claim 1, wherein a cross section of the third surface of the first adhesive layer has a concave shape.
3. The adhesive optical film according to claim 1, wherein a cross section of the third surface of the first adhesive layer has a convex shape.
4. An image display device comprising the adhesive optical film according to claim 1.
5. The adhesive optical film according to claim 1, further comprising a second adhesive layer,
wherein the first optical film has a first surface and a second surface opposite to the first surface, and
wherein the second adhesive layer is adhered directly upon the first surface of the first optical film and the first adhesive layer is adhered directly upon the second surface of the first optical film.
6. The adhesive optical film according to claim 1, wherein the first optical film is one of a polarizing plate, a polarization conversion element, a reflector, a semitransparent reflector, a retardation plate, a viewing angle compensating film, a brightness enhancement film and a protective film.
7. The adhesive optical film according to claim 1, wherein the second optical film is one of a polarizing plate, a polarization conversion element, a reflector, a semitransparent reflector, a retardation plate, a viewing angle compensating film, a brightness enhancement film and a protective film.

* * * * *

UNITED STATES PATENT AND TRADEMARK OFFICE
CERTIFICATE OF CORRECTION

PATENT NO.        : 8,580,367 B2                                                              Page 1 of 1
APPLICATION NO.   : 10/532712
DATED             : November 12, 2013
INVENTOR(S)       : Satake et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1376 days.

Signed and Sealed this
Twenty-second Day of September, 2015

Michelle K. Lee
*Director of the United States Patent and Trademark Office*